United States Patent [19]

Bachar

[11] 4,027,370
[45] June 7, 1977

[54] HIGH FREQUENCY VIBRATION INSERTION APPARATUS

[75] Inventor: John J. Bachar, Danbury, Conn.

[73] Assignee: Branson Ultrasonics Corporation, New Canaan, Conn.

[22] Filed: Oct. 21, 1976

[21] Appl. No.: 734,616

[52] U.S. Cl. .................... 29/818; 29/788; 29/432.2; 156/423; 156/580.1; 221/293; 228/1 R; 228/903

[51] Int. Cl.² .......................................... B23Q 7/10

[58] Field of Search ......... 29/200 B, 208 D, 211 D, 29/211 R, 208 R, 432, 432.2; 227/149, 114, 115, 116, 117, 118; 228/1, 49, 903; 156/423, 580.1; 221/293, 200

[56] References Cited

UNITED STATES PATENTS

| | | | |
|---|---|---|---|
| 2,306,851 | 12/1942 | Ward | 29/211 D |
| 2,806,219 | 9/1957 | Cavanaugh | 227/116 |
| 3,046,643 | 7/1962 | Sharpe | 29/208 R |
| 3,184,353 | 5/1965 | Balamuth et al. | 29/432 X |
| 3,542,272 | 11/1970 | Lemal et al. | 227/114 |
| 3,577,624 | 5/1971 | Bentschneider | 29/211 D |
| 3,586,589 | 6/1971 | Jugler | 228/1 X |
| 3,790,059 | 2/1974 | Jacke et al. | 228/1 |
| 3,859,705 | 1/1975 | Dulude et al. | 29/208 D X |

*Primary Examiner*—Victor A. DiPalma
*Attorney, Agent, or Firm*—Ervin B. Steinberg; Philip J. Feig

[57] ABSTRACT

A high frequency vibration insertion apparatus using high frequency vibrations and pressure for inserting an element into a body operates in conjunction with an automatic feed means which feeds such elements seriatim into a guide. The guide has an axial bore in which the resonator of the high frequency vibration apparatus operates. The guide accurately positions the element upon the body prior to such element being inserted into the body responsive to pressure and high frequency vibrations applied by the resonator.

11 Claims, 5 Drawing Figures

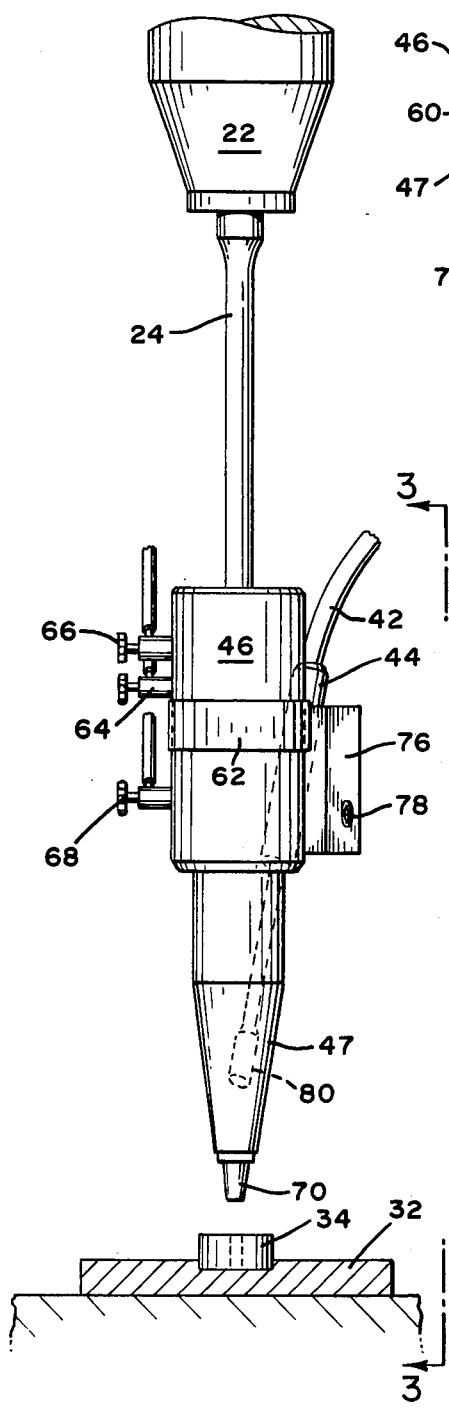
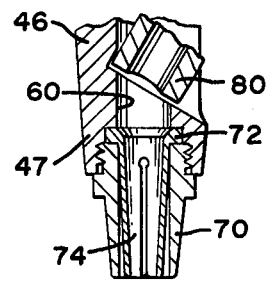
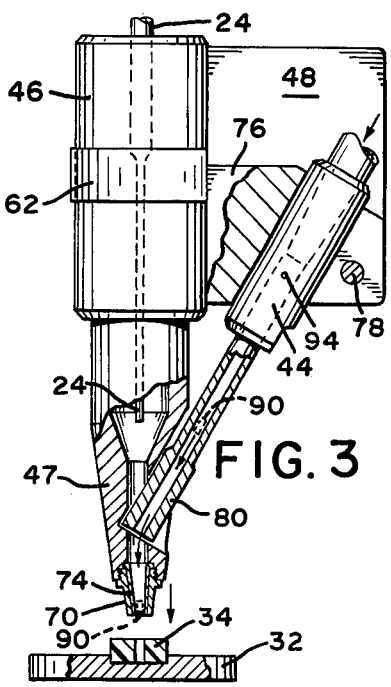
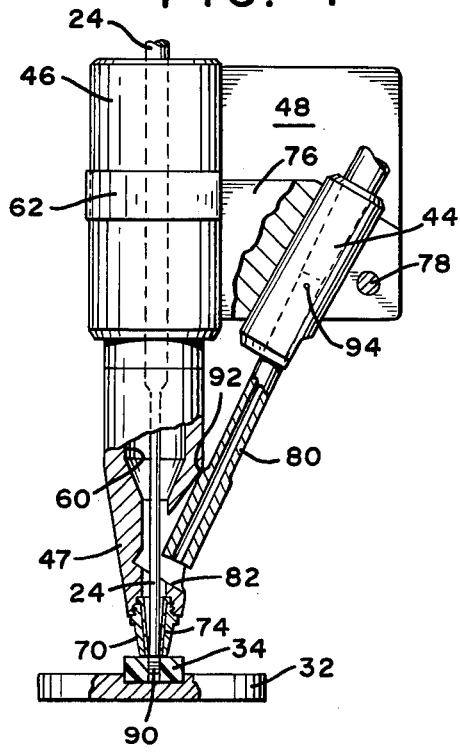

HIGH FREQUENCY VIBRATION INSERTION APPARATUS

BRIEF SUMMARY OF THE INVENTION

The present invention refers to an apparatus for inserting an element into a body using high frequency vibrations and more specifically refers to such an apparatus which performs the insertion automatically, with a high degree of accuracy and speed, and without risk of injury to an operator. Quite specifically, the present invention concerns an apparatus for inserting metallic elements into a thermoplastic body using high frequency vibrations in the ultrasonic frequency range and including automated feed means and precise locating means for achieving insertion with great accuracy at high production rates.

The method of inserting a hard element, such as a metal insert, into a body comprising for instance thermoplastic material, using high frequency vibratory energy is known. For example, U.S. Pat. No. 3,184,353 to L. Balamuth et al, issued May 18, 1965, entitled "Fastening Together of Members by High Frequency Vibrations" discloses an apparatus for inserting a non-plastic element into a thermoplastic body. The present invention utilizes this process but discloses an improved apparatus having automatic means for feeding the elements seriatim and a mechanism for accurately aligning each element upon the body receiving such element prior to insertion by high frequency vibrations.

To this end, the invention, among other important features, provides a guide having an axial bore and means disposed at the end of the bore for retaining an element fed from a feed means. A resonator, dimensioned to be resonant as a half wavelength resonator at a predetermined high frequency in the range between one and 100 kilohertz, is disposed and shaped for undergoing reciprocating motion within the bore of the guide to engage one end of the element. With the element disposed in the bore and the body into which the element is to be inserted disposed on an anvil, the element and the body are brought into contact with one another in proper alignment. Pressure means acting between the resonator and anvil supporting the body urge the resonator into forced contact with the element and cause the element to penetrate into the body while the resonator is rendered resonant. After the element has been inserted into the body, the force acting between the resonator and anvil is removed and the resonator retracts within the bore. When the resonator has returned to its retracted position, another element is fed into the bore and positioned in the guide for insertion.

The element to be inserted may be metallic or plastic, but must be harder or have a higher melting temperature than that of the body receiving the element. In a preferred embodiment, the element is a metallic insert inserted into a thermoplastic body, such as a molded thermoplastic workpiece.

The apparatus described above provides for the rapid, safe and accurate insertion of elements into a body. Specifically, by aligning the bore of the guide with the body on a fixed anvil, the element will be inserted into the body at the desired location with a high degree of accuracy. The provision of feed means for feeding elements seriatim into the bore allows completely automated insertion, thereby not only eliminating the chances of operator injury, but also increasing the production rate.

A principal object of this invention, therefore, is the provision of an apparatus for automatically inserting an element into a body using high frequency vibratory energy.

Another important object of this invention is the provision of an apparatus for providing more accurate insertion of an element into a body.

Still another object of this invention is the provision of an apparatus for automatically inserting seriatim elements into a body with a high degree of precision.

A further object of this invention is the provision of an apparatus for inserting metallic elements into a thermoplastic body at high production rates utilizing high frequency vibrations.

Further and still other objects of this invention will become more clearly apparent when the following specification is read in conjunction with the accompanying drawings.

BRIEF DESCRIPTION OF THE DRAWINGS:

FIG. 2 is an elevational view of the important parts forming largely the subject of the present invention;

FIG. 3 is a view partly in section, along line 3 — 3 in FIG. 2;

FIG. 4 is an elevational view, partly in section, revealing the condition of certain parts during the insertion process, and FIG. 5 is an enlarged sectional view of the body engaging end of the guide.

DESCRIPTION OF THE INVENTION

Figure 1:
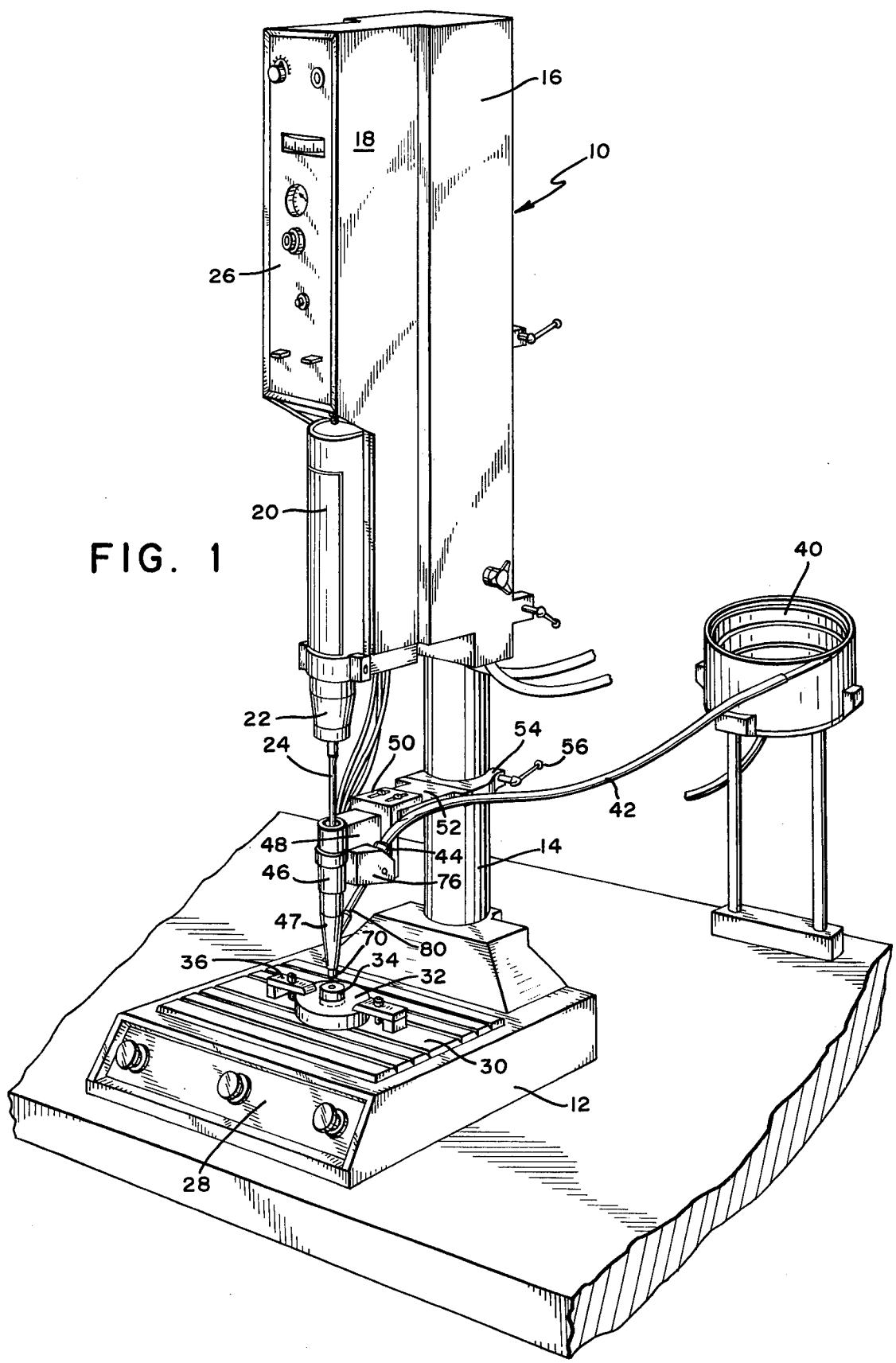
FIG. 1 is a perspective view of the apparatus and feed means.

Referring now to the figures and FIG. 1 in particular, numeral 10 identifies an ultrasonic apparatus as disclosed in U.S. Pat. No. 3,790,059 issued to S. E. Jacke et al on Feb. 5, 1974 entitled "Ultrasonic Apparatus." The sonic apparatus as described in a more detailed manner in the patent includes a base 12, an upstanding post 14, an electronic power supply 16, a motion mechanism enclosure 18, and a circular enclosure 20 for enclosing therein an electroacoustic converter for converting electrical high frequency applied to the converter to mechanical vibrations. A converter suitable for this purpose utilizing piezoelectric disk transducers is shown in detail in U.S. Pat. No. 3,524,085 issued to A. Shoh on Aug. 11, 1970 entitled "Sonic Transducer." The output end of the converter is coupled to an intermediate resonator or horn 22 which, in turn, is coupled to another resonator or horn 24 of cylindrical stepped shape which operates upon the element to be inserted as will be explained later. The resonator 24, the intermediate resonator 22 and the electroacoustic converter are dimensioned to resonant along their longitudinal axis to form mechanical half wavelength resonators when energized with electrical energy of predetermined high frequency, typically a frequency in the range from one to 100 kHz, but most suitably in the range from 16 to 60 kHz. Resonators are well known in the art and their construction is described in "Ultrasonic Engineering" (book) by Julian R. Frederick, John Wiley & Sons, New York, N.Y., 1965 pp. 87 to 103.

The apparatus 10 includes also a control panel 26 for adjusting fluid pressure, power transfer time, dwell time, etc. and a base control panel 28 containing two actuating start pushbuttons and a centrally disposed emergency stop pushbutton. The base 12 includes a mounting plate 30 which supports, in turn, a fixture 32 for nesting therein a body 34 into which an element is to be inserted. The body 34 shown here as a circular bushing most suitably comprises a polymeric thermoplastic workpiece and may be in the shape of a molded body which receives several inserts. The fixture 32 is held to the plate 30 by a pair of suitable clamps 36.

As shown in the patent to Jacke supra, the motion mechanism within the enclosure 18, when actuated responsive to fluid (air) pressure, causes the converter, the intermediate resonator 22 and the resonator 24 to undergo reciprocating motion toward and away from the base 12 and mounting plate 30. The motion is controlled by a timing circuit (not shown) whose controls are mounted on the panel 26. A typical motion mechanism for the converter providing such reciprocating motion along an axis parallel to the upstanding post 14 is shown also in U.S. Pat. No. 3,586,589 to John Jugler, dated June 22, 1971, entitled "Ultrasonic Tool and Stand." The above described apparatus and components are commercially available products and have been described in considerable detail in the patents supra which are incorporated herein by reference.

For the purpose of the present invention, the apparatus includes a vibratory feeder 40 which aligns seriatim elements serving as inserts and feeds the properly oriented elements one by one to a conduit 42 which is coupled to a feed tube 44 which is secured to a guide 46. The guide 46 is coupled to a fluid pressure responsive motion mechanism 48 which is fastened to an L-shaped plate 50 that is fastened to a horizontal flange plate 52. The flange plate 52 is screw fastened to a clamp ring 54 which secures the motion mechanism 48 and guide 46 to the post 14, but permits vertical positioning along the post by virtue of a clamp screw and handle 56.

Referring now specifically to FIGS. 2 through 5 the guide 46 has a central bore 60 (FIG. 4) through which the resonator 24 translates. The guide 46 is held to the motion mechanism 48 by means of a ring 62. The motion mechanism, responsive to fluid pressure applied at inlet valve 64, causes the guide 46 to undergo reciprocating motion toward and away from the plate 32 supporting the body 34. The speed of the downward and of the upward motion is controlled by a set of throttle valves 66 and 68 whose respective fluid conduits lead to control valves, not shown. The frontal portion 47 of the guide 46 is tapered toward its lower end and is fitted with a threaded bushing 70 which retains a collet 72 in the bore of the guide, see FIG. 5. The collet 72 includes a set of resilient fingers 74 for frictionally retaining an element fed into the guide from the feeding mechanism via conduit 42 and the feed tube 44.

The feed tube 44 is clamped to the stationary housing of the motion mechanism by means of a plate 76 and a screw 78. The feed tube 44 connects to a conduit 80 which is adapted to reach with its front end into a generally radially disposed aperture 82 of the guide 46 at the area of the tapered frontal portion 47 and establishes communication with the bore 60 of the guide 46 for inserting into the bore an element fed through the feed path established by the several conduits described.

Operation of the Apparatus

With the resonator 24 in its raised position and the guide 46 in its raised position (lifted from the body 34),
as shown in FIG. 3, an element, such as a metal insert 90 is fed from the feed means 40 via conduit 42, feed tube 44 into conduit 80 and comes to rest in the collet 72 of the bushing 70, substantially flush with the frontal surface of the bushing 70. The fingers resiliently engage the outer surface of the insert. When the element (insert) is disposed in the guide and at the frontal end thereof, the motion mechanism 48 is actuated, thereby causing fluid pressure to move the guide 46 toward the body 34 and the lower body engaging end of the guide to engage the upper surface of the body 34, see FIG. 4. This operation accurately positions the insert element on the body. As the guide 46 moves downward, a cam surface 92 forming a part of the guide moves downward and slightly pivots the conduit 80 in a counterclockwise rotation about a pivot pin 94, thus clearing the internal bore of the guide from obstruction, i.e. the feed conduit. Next, the resonator 24, FIG. 3, is rendered resonant at its predetermined high frequency responsive to energizing the electroacoustic converter, and fluid pressure applied causes the converter and resonator to move downward. The front end of the resonator engages the upper surface of the element 34, see FIG. 4, and the combination of force and vibratory energy acting upon the element 90 and body 34 drives the element 90 into an aperture of the body 34. The downward motion of the resonator is controlled by a mechanical stop in a known manner. After insertion has been completed, the vibratory energy is stopped and the resonator 24 and the guide 46 are lifted, causing both to resume the raised position as shown in FIGS. 2 and 3. In this raised position the feed conduit 80 is restored once again, responsive to a spring force (not shown) for establishing communication with the bore 60 of the guide 46, thereby causing another element to have an unobstructed path for being fed from the feed means to the bore of the guide and to be retained by the resilient fingers 74 of the collet 72, see also FIG. 5. The insertion procedure as described above can now be repeated either on a new body or at a different location of the same body.

It will be apparent that other resilient means may be used instead of the collet for temporarily retaining the element in the guide. Moreover, in an alternative embodiment the guide 46 can be retained stationary and the body 34 disposed in a fixture which is mounted to move reciprocatingly toward and away from the front end of the guide. This latter embodiment also provides for accurate and automated insertion of an element into a body, being essentially a reversal of certain actions.

While there has been described and illustrated a preferred embodiment of the present invention and several modifications have been indicated, it will be apparent to those skilled in the art that various further changes and modifications may be made therein without deviating from the broad principle and teachings of the invention which shall be limited only by the scope of the appended claims.

I claim:

1. A high frequency vibration insertion apparatus for inserting an element into a body comprising:

a guide having an axial bore;

feed means for feeding an element into said bore toward a body engaging end of said guide;

means disposed in said bore for retaining an element fed from said feed means in said bore and in proximity to said body engaging end;

a resonator dimensioned to be resonant as a half wavelength resonator at a predetermined high frequency disposed for reciprocating motion within said bore and to engage with one end surface thereof an element fed into said bore and retained therein;

electroacoustic converter means coupled to the other end surface of said resonator for causing, when said converter means is energized, said resonator to be resonant, and force means coupled for causing an element retained in said bore to be forced out of said bore and driven into a body disposed opposite said body engaging end responsive to said resonator being resonant and said one resonator end surface being in forced engagement with such element.

2. A high frequency vibration insertion apparatus as set forth in claim 1, and means coupled to said guide for reciprocating said guide between a first position where said body engaging end is adapted for physical contact with a body disposed opposite said end and a second position where said end is spaced from such body.

3. A high frequency vibration insertion apparatus as set forth in claim 2, said means for reciprocating causing said guide to move relative to said resonator and along the axis of said bore.

4. A high frequency vibration insertion apparatus as set forth in claim 1, said feed means adapted to feed elements seriatim.

5. A high frequency vibration insertion apparatus as set forth in claim 1, said resonator being dimensioned to be resonant at a predetermined high frequency in the range between 16 kHz and 100 kHz.

6. A high frequency vibration insertion apparatus as set forth in claim 1, said force means comprising fluid pressure means.

7. A high frequency vibration insertion apparatus as set forth in claim 1, said means for retaining an element comprising resilient means shaped for frictionally contacting the element.

8. A high frequency vibration insertion apparatus as set forth in claim 7 said means for retaining an element comprising a collet having resilient fingers for engaging the outer surface of the element.

9. A high frequency vibration insertion apparatus as set forth in claim 1, said bore being of cylindrical shape and including a generally radially oriented aperture for receiving therein a conduit feeding an element from said feed means to said bore of said guide.

10. A high frequency vibration insertion apparatus as set forth in claim 9, said conduit received in said aperture being mounted for pivotal motion, means for reciprocatingly moving said guide toward and away from a body disposed opposite said body engaging end of said guide coupled to said guide, and means coacting between said guide and conduit for moving said conduit responsive to said motion of said guide.

11. A high frequency vibration insertion apparatus for inserting an element into a body comprising;

a base having a post upstanding therefrom;

an elongated guide hving an axial bore supported by said post and distanced therefrom;

feed means coupled for feeding an element into said bore toward a body engaging end of said guide;

motion means coupled to said guide for reciprocating said guide toward and away from a body disposed on said base;

means disposed in said bore for retaining an element fed from said feed means in said bore and in proximity to said body engaging end;

a resonator dimensioned to be resonant as a half wavelength resonator at a predetermined high frequency disposed for reciprocating motion within said bore and to engage with one end surface thereof an element fed into said bore and retained therein;

electroacoustic converter means adjustably supported along said post coupled to the other end surface of said resonator for causing, when said converter means is energized, said resonator to be resonant, and force means coupled to said resonator for causing an element retained in said bore to be forced out of said bore and driven into a body disposed on said base responsive to said resonator being resonant and said force means acting upon said resonator.

* * * * *